United States Patent [19]
Kaneda

[11] Patent Number: 6,002,885
[45] Date of Patent: Dec. 14, 1999

[54] LENS BARREL ATTACHABLE TO AND DETACHABLE FROM MAIN BODY OF OPTICAL APPARATUS SUCH AS CAMERA

[75] Inventor: Naoya Kaneda, Chigasaki, Japan

[73] Assignee: Canon Kabushiki Kaisha, Tokyo, Japan

[21] Appl. No.: 08/775,024

[22] Filed: Dec. 27, 1996

[30] Foreign Application Priority Data

Jan. 5, 1996 [JP] Japan ................................... 8-017171

[51] Int. Cl.[6] .................................................. G03B 17/00
[52] U.S. Cl. .............................................. 396/72; 396/529
[58] Field of Search .............................. 396/79, 72, 111, 396/89, 349, 448, 529; 348/340, 342, 360; 359/694, 696–698, 723, 738, 827, 888, 889, 892

[56] References Cited

U.S. PATENT DOCUMENTS

| | | | |
|---|---|---|---|
| 4,536,057 | 8/1985 | Sumi et al. .............................. | 359/889 |
| 4,920,369 | 4/1990 | Kaneda et al. .............................. | 396/81 |
| 5,212,598 | 5/1993 | Kikuchi .................................... | 359/698 |
| 5,402,174 | 3/1995 | Takahashi ............................ | 396/529 X |
| 5,677,791 | 10/1997 | Yoshibe et al. ....................... | 359/694 X |
| 5,781,236 | 7/1998 | Shinbori et al. .......................... | 348/342 |

FOREIGN PATENT DOCUMENTS

| | | |
|---|---|---|
| 1-280709 | 11/1989 | Japan . |
| 1-321416 | 12/1989 | Japan . |
| 6-167676 | 6/1994 | Japan . |

Primary Examiner—W. B. Perkey
Attorney, Agent, or Firm—Fitzpatrick, Cella, Harper & Scinto

[57] ABSTRACT

A lens barrel attachable to and detachable from a main body including a lens system, and a transparent plate provided closer to the main body than a rearmost lens unit of the lens system.

30 Claims, 10 Drawing Sheets

LENS BARREL ATTACHABLE TO AND DETACHABLE FROM MAIN BODY OF OPTICAL APPARATUS SUCH AS CAMERA

BACKGROUND OF THE INVENTION

1. Field of the Invention

The present invention relates generally to a lens barrel attachable to and detachable from a main body of an optical apparatus such as a video camera, a still camera and a monitor camera, and more particularly to a lens barrel incorporating a lens system a closest-to-main-body lens of which is moved, and also a lens barrel including, e.g., an inner focus type zoom lens.

2. Related Background Art

In recent years, a typical zoom lens as a conventional art zoom lens used for this kind of optical apparatus has been of a so-called inner focus type or rear focus type constructed such that focusing is performed by use of a lens unit located more rearward than a varieter lens instead of a theretofore prevailing so-called front lens element focus system wherein the foremost lens unit serves as a focus lens. With this inner focus lens arrangement, phototaking at the closest focusing distance becomes more possible than by a front focus lens arrangement, and the arrangement may be easily constructed to perform continuous focusing from just anterior to the lens up to the infinity especially on the wide-angle side.

A variety of lens types of the inner focus zoom lens are known. FIG. 1 illustrates a lens constructed of 4 lens units, wherein the rearmost lens unit is employed for focusing. Referring to FIG. 1, there are shown a fixed front lens unit 111, a varieter lens unit 112 for changing a focal length, a fixed lens unit 113, and a focus lens unit 114 for focusing and compensating a change of focus position when changing the focal length.

Shown also are a rotation preventive guide bar 133, a feed bar 134 for the varieter lens unit 112, a fixed lens barrel 135, a stop unit 136 (herein inserted at a right angle to the paper sheet surface), a step motor 137 defined as a focusing motor, an output shaft 138 of the step motor 137, whose shaft is worked to form a male thread 138a for moving the lens unit 114. A female threaded portion 139 meshing with the male thread 138a is integral with a moving frame 140 for the lens 114.

Shown further are guide bars 141, 142 for the lens 114, a rear plate 143 for positioning and holding the guide bars 141, 142, a relay holder 144, a zoom motor 145, a decelerator unit 146 of the zoom motor 145, and interlocking gears 147, 148, the gear 148 being fixed to the zoom feed bar 134.

An operation of the lens shown in FIG. 1 will be explained. When driving the step motor 137, the focus lens 114 is moved in the optical axis directions by the help of the screw feed. Further, when the zoom motor 145 is driven, the screw shaft 134 is rotated through the interlocking gears 147, 148, and the varieter lens unit 112 held in the lens frame 112a that meshes with the screw shaft 134 is moved in the optical axis directions.

FIG. 2 is a graph showing a positional relationship of the varieter lens unit 112 versus the focus lens unit 114 in the lens barrel constructed as shown in FIG. 2, corresponding to some object distances. FIG. 2 shows more specifically the focusing positional relationship with respect to respective objects located at an infinite distance, 2 m, 1 m, 80 cm and 0 cm. As shown in FIG. 2, in the case of the inner focus, the positional relationship between the varieter lens unit 112 and the focus lens unit 114 differs depending on the object distance, and hence the focus lens unit 114 cannot be interlocked by a mechanical structure as in the case of a cam ring of the front focus lens.

Then, it is indispensable to control the positions of the respective lens units 112, 114 in accordance with the object distance so as to satisfy the positional relationship between the lens units when zooming as shown in FIG. 2. It is proposed that trajectory tracing methods each showing the positional relationship between the varieter lens unit 112 and the focus lens unit 114 in accordance with the object distance in Japanese Patent Application Laid-Open Nos.1-280709 and 1-321416.

FIG. 3 is a diagram showing a construction of a video camera in which this trajectory tracing method is carried out. The numerals 111 to 114 represent the same lens units as those shown in FIG. 1. A position of the varieter lens unit 112 is detected by a zoom encoder 149. Herein, an encoder type conceivable herein may be a volume encoder constructed so that a brush integrally attached to a varieter moving ring slides on a substrate printed with a resistance pattern.

A stop encoder 150 for detecting a stop value involves the use of an output of a hall element provided in, e.g., a stop meter. The numeral 151 designates an image pick-up element such as a CCD, etc., and the numeral 152 represents a camera processing circuit. Y-signals are taken in an AF circuit 153. This AF circuit 153 determines whether the object is focused or defocused. If defocused, there may be made determinations as to whether anterior or posterior focusing is effected, or what degree the object is defocused to. Results thereof are inputted to a CPU 154.

A power-ON reset circuit 155 performs a variety of reset operations when switching ON the power supply. A zoom operation circuit 156 transfers, when the operator operates a zoom switch 157, a content thereof to the CPU 154. The numerals 158 to 160 designate memories for storing the trajectory data shown in FIG. 2. The memories are the direction data memory 158, the velocity data memory 159 and the boundary data memory 160.

Shown also therein are a zoom motor driver 161 and a step motor driver 162. The CPU 154 continuously counts up the number of input pulses supplied from this step motor driver 162 to the step motor 137, and this count number is used by an encoder for obtaining an absolute position of the focus lens unit 114.

By such a construction, the positions of the varieter lens unit 112 and of the focus lens unit 114 are obtained from the number of input pulses of the step motor 137 as well as by the zoom encoder 149, and therefore one point on a map shown in FIG. 2 is determined from the positions of the above two lens units.

On the other hand, the map shown in FIG. 2 is segmented into small zones I, II, III, ... each assuming a rectangular shape as illustrated in FIG. 4 by boundary data 160. Oblique portions are regions where a pair of lens units are inhibited from being disposed. Thus, once one point on the map is thus determined, it is feasible to determine which small zone that one point belongs to.

In the memories, there are the velocity data and the direction data per zone that indicate a rotating speed and direction of the step motor 137, which are obtained from trajectories passing through the centers of the respective zones. For instance, in the example shown in FIG. 4, an axis of abscissas (a position of the varieter lens unit) is divided into 10 zones. Now, supposing that a velocity of the zoom motor 145 is set to move the varieter lens unit from a telescopic end to a wide-angle end in 10 seconds, a passage time through one zone in the zooming direction is 1 second.

FIG. 5 is an enlarged diagram of the block III in FIG. 4. A trajectory 164 runs through the center of this block III, a trajectory 165 passes leftward downward, and a trajectory 166 runs rightward upward. These trajectories have inclinations that are somewhat different from each other. Herein, the focus lens unit is, if moved at a velocity of x mm/1 sec on the central trajectory 164, capable of tracing on the trajectory with substantially no error.

When the thus obtained velocity is termed a "zone representative velocity", the velocity memory is stored with values thereof for only the number of small zones in accordance with the zones. Further, supposing that this velocity is indicated by the arrow 168, a velocity of the step motor is set by minutely adjusting the representative velocity as shown by the arrows 167, 169, depending on results of the detection by the autofocus adjusting device. Moreover, the rotating direction of the step motor 137 varies corresponding to the zones even in the case of zooming from the same telephoto end to the wide-angle end (from the wide-angle end to the telephoto end), and hence the direction data memory is stored with code data thereof.

As discussed above, the position of the focus lens unit is controlled by driving the step motor 137 during the drive of the zoom motor 145, which involves the use of the step motor velocity obtained by compensating the above zone representative velocity from the result of the detection by the autofocus adjusting device with respect to the zone representative velocity obtained from the varieter lens position and the focus lens position as well. The focus position can be thereby kept also during zooming even in the case of the inner focus lens.

Further, there exists a method by which the velocities indicated by the arrows 167, 169 in addition to the representative arrowed velocity 168 in FIG. 5 are memorized, and three velocities are selected corresponding to the results of detection by the autofocus adjusting device.

Excluding the above-described method of memorizing the velocities, there might be employed a method of calculating a trajectory passing through one point on the map that is determined by present positions of the varieter lens unit 112 and of the focus lens unit 114 and tracing on this trajectory, and a method of memorizing a plurality of trajectories as positions of the focus lens unit 114 that correspond to the positions of several varieter lens units 112.

Disclosed in Japanese Patent Application Laid-Open No. 1-321416 is a method of storing data about position of the focus lens unit 114 versus each of a plurality of positions of varieter lens unit 112 between the wide-angle end and the telescopic end with respect to a plurality of object distances (which corresponds to storing the trajectory data in FIG. 2), then recognizing where positions of the varieter lens unit 112 and of the focus lens unit 114 exist within the map when starting the zooming process, subsequently performing, based on that point, interpolation arithmetic from the, stored data of the closest trajectory at the anterior focus side and from the stored data of the closest trajectory at the posterior focus side at the same focal length, and calculating the positions of the focus lens unit at the respective focal lengths (the positions of the varieter lens unit).

FIG. 6 illustrates a trajectory in the vicinity of the telephoto end when zooming. According to Japanese Patent Application Laid-Open No. 1-321416, there are stored pieces of data $rr_1$, $rr_4$, $rr_7$, $rr_9$ indicating positions of the focus lens unit 114 versus positions $V_n$ (the telephoto end), $V_{n-1}$, $V_{n-2}$, $V_{n-3}$ of the varieter lens unit 112 along a trajectory I (e.g., an infinite distance focusing trajectory). That is, it follows that the trajectory running through points $P_1$, $P_4$, $P_7$, $P_{10}$ in the map is stored as the infinite distance trajectory.

Similarly, pieces of data $rr_2$, $rr_5$, $rr_8$, $rr_{11}$ indicating positions of the focus lens unit versus the positions $V_n$ (the telescopic end), $V_{n-1}$, $V_{n-2}$, $V_{n-3}$, are stored in the form of trajectory (e.g., a 10 m focusing trajectory). As a matter of course, these data are actually created over the entire zoom region extending from the telephoto end to the wide-angle end.

Herein, when zoomed from the point ($V_n$, rr) in the map, points $P_A$, $P_B$, $P_C$ are obtained by the interpolation arithmetic based on the stored data of the closest trajactory at the anterior focus side in the same position of the varieter lens unit position from the point P, i.e., data of a trajectory II, and similarly the data closest of the trajactory at the posterior focus side, i.e., data of a trajectory I. The trajectory during zooming is determined by thus obtaining the respective positions of the focus lens unit 114 with respect to the focal lengths $V_0$ (the wide-angle end), $V_1$, $V_2$, .... $V_{n-1}$, $V_n$ (the telescopic end).

Herein, because of the interpolation arithmetic, a ratio of a distance between the points $P_1$ and P to a distance between the points $P_2$ and P is equal to a ratio of a distance between, e.g., the points $P_A$ and $P_4$ to a distance between the points $P_A$ and $P_5$.

The memory pertaining to the above velocities or positions is constructed based on optical design values when the manufacturing error is set, as a matter of course, to 0.

Note that the following embodiments of the present invention take such a configuration that the second lens in, as in the above-described example, the 4-lens-unit, i.e., convex/concave/convex/convex, inner focus lens is the varieter lens, and the fourth lens is the focus lens, and in addition thereto, may also be adapted to other configurations (shown in FIGS. 5, 7 and 8 in, e.g., Japanese Patent Application Laid-Open No. 3-27011).

Further, in the example shown in FIG. 1, the actuator for zooming involves the use of the DC motor with the gear head. As in the case of the focus lens unit, however, the step motor may also be used. Also, as the encoder for the varieter lens unit, the volume type encoder is not employed, but there may be adopted an encoder for detecting the absolute position of the lens unit by counting the number of input pulses for the reset fiducial position as in the case of the focus lens unit. There is also a method of using a photo interrupter for the reset fiducial position. Known also are method of employing an ultrasonic motor and a method of using a voice coil type as the actuator for each movable lens unit.

The conventional inner focus lens is constructed as described above, and therefore, when this inner focus lens is used as a so-called interchangeable lens interchangeable with respect to a video camera main body, it might happen that a rearmost (closest to the main body) movable lens unit of the interchangeable lens removed is easily touched (including a case of, e.g., cleaning the lens), or a static pressure weight is applied depending on the way it is treated.

In such a situation, for example, according to the construction for moving the rearmost lens unit by use of the above-mentioned step motor, it is impossible to keep a normal image forming performance because of the lens unit deviating or tilting from a normal on-optical axis position due to the fact that an interlocking mechanism of the screw feeding portion is broken, or that an interlock meshing state is inadequate, or deformation caused with the static pressure weighting of the mechanism which holds the rearmost lens unit. Alternatively, there might be a possibility in which dust or water drops carelessly permeate the interior of the lens barrel sufficient to break the respective mechanisms.

SUMMARY OF THE INVENTION

It is an object of the present invention to provide a lens barrel capable of protecting a rearmost lens unit and respective mechanisms, and attachable to and detachable from a main body.

According to a first aspect of the present invention, a lens barrel comprises a lens system, and a transparent plate provided closer to the main body than a rearmost lens unit of the lens system.

According to a second aspect of the present invention, a lens barrel comprises a lens system, and a transparent plate provided closer to the main body than a rear-most movable lens unit of the lens system.

In the first and second aspects of the invention, as the lens system, the lens unit is a focusing lens unit movable in optical axis directions for focusing. There is a lens system having a varieter lens unit movable in the optical axis directions for changing a focal length of the lens system. In this case, the lens barrel further comprises a motor for driving the focusing lens unit, and a motor for driving the varieter lens unit.

The transparent plate has a glass plate or a plastic plate. Furthermore, there can be taken such a mode that the transparent plate is attachable to and detachable from the lens barrel. Also, the transparent plate incorporates any one of an ND filter, a low-pass filter, a color temperature conversion filter, or a soft image forming filter.

There can be adopted both a mode in which the rearmost part of a mount of the lens barrel is more protruded toward the main body than the transparent plate, and a mode in which the rearmost part thereof is not more protruded.

According to a third aspect of the present invention, a lens barrel comprises a lens system, and an ND filter, with a variable density, provided closer to the main body than a rearmost lens unit of the lens system.

According to the third aspect of the invention, the lens unit is a focusing lens unit movable in optical axis directions for focusing. There is a lens system having a varieter lens unit movable in the optical axis directions for changing a focal length of the lens system. In this case, the lens barrel further comprises a motor for driving the focusing lens unit, and a motor for driving the varieter lens unit. Also, there may be adopted both a mode in which a rearmost part of a mount of the lens barrel is more protruded toward the main body than the transparent plate, and a mode in which the rearmost part thereof is not more protruded.

According to the present invention, an optical apparatus comprises a lens barrel in any one of the modes described above, and a main body fitted with the lens barrel. A camera according to the present invention comprises a lens barrel in any one the above-described modes, and a main body fitted with the lens barrel. The above lens unit is constructed of a single piece or a plurality of lenses.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 7:
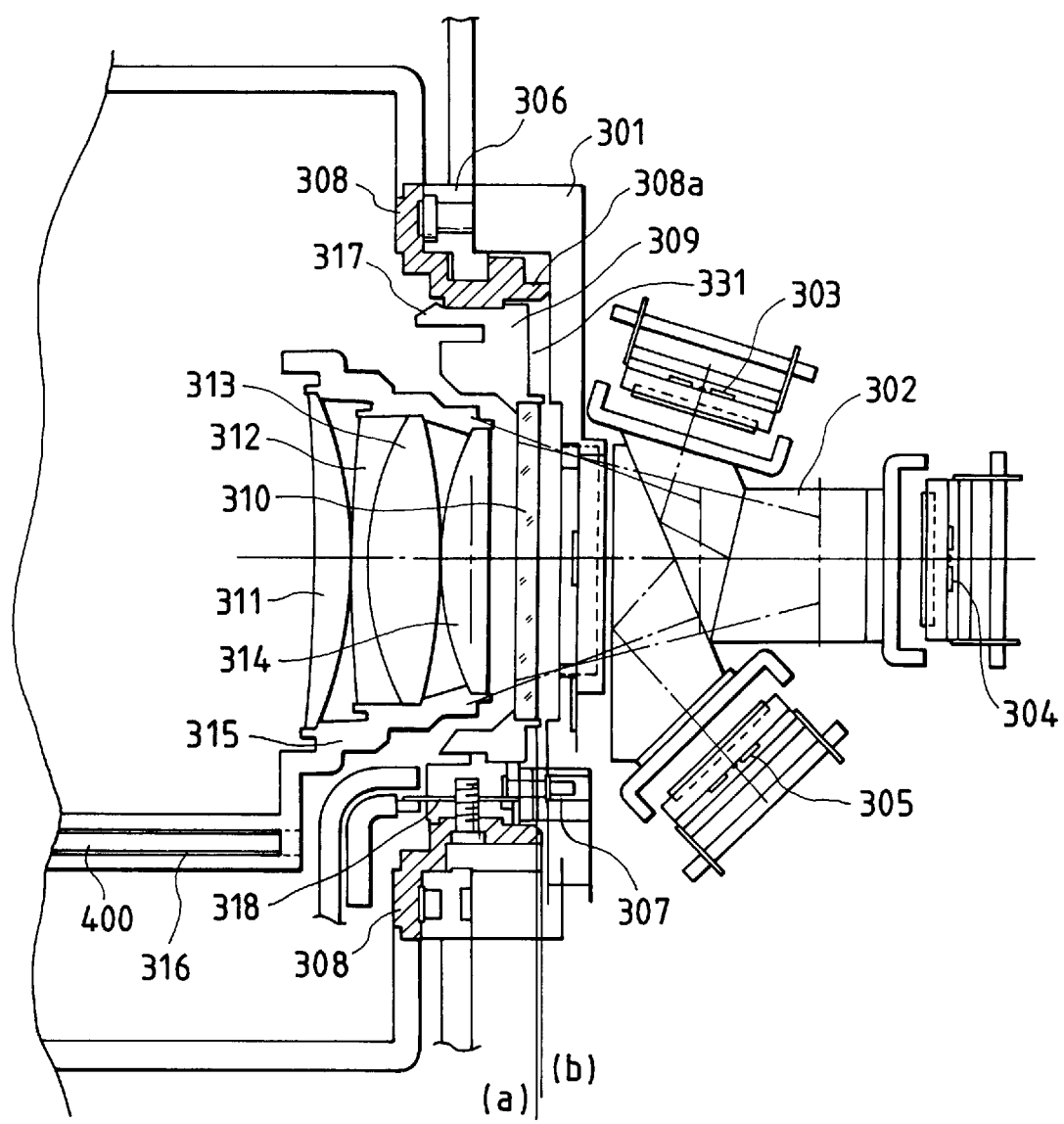
FIG. 7 is a vertical sectional view showing how a lens barrel in an embodiment 1 of the present invention is attached to a camera.
Figure 8:
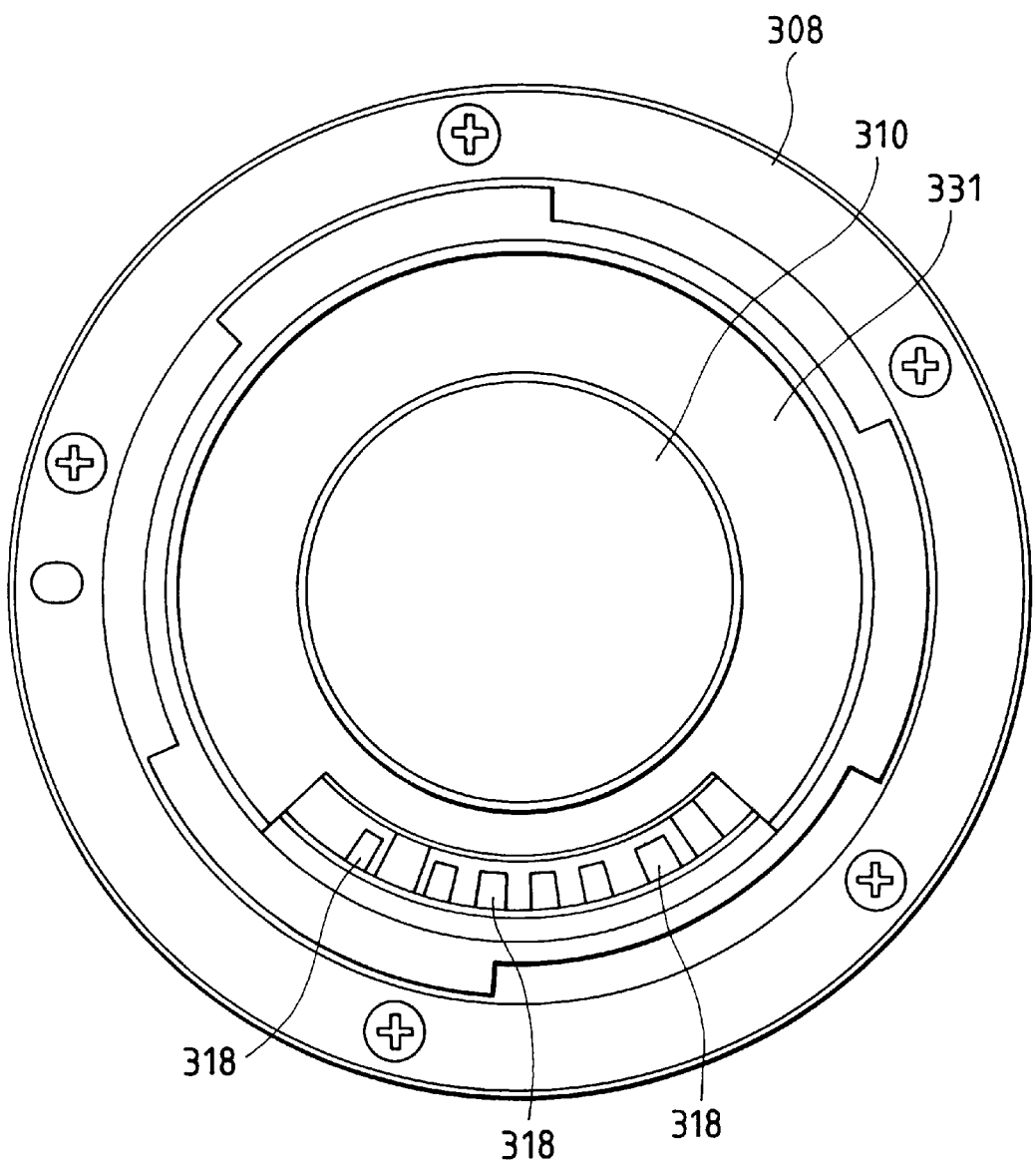
FIG. 8 is a sectional view of the lens barrel before being attached to the camera.

FIG. 7 is a sectional view illustrating how a lens barrel is attached to a main body of a camera as an optical apparatus in an embodiment 1 of the present invention. FIG. 8 is a view showing a rear end surface of the lens barrel before being attached on the front side of the camera. The camera main body includes three pieces of prisms, and a camera assumed herein is a so-called 3 CCD video camera constructed to obtain an image by separating an image-forming light beam coming from the lens barrel into, e.g., three colors of RGB (Red, Green and Blue). Other kinds of cameras, however, may be available.

The camera main body includes a color separation prism 302, a base member 301, for holding this color separation prism 302, fitted with mount members, and a mount member 306 (Herein, a bayonet mount is employed; However, other fastening mounts may also be available) for an interchangeable lens (a lens barrel attachable to and detachable from the main body), and CCDs 303 to 305. Further, the camera main body includes an electric contact point 307 through which a variety of communications are performed between a camera-side microcomputer and a lens-side microcomputer in order to execute an autofocus function and an auto-iris function.

On the other hand, the lens-side incorporates four pieces of lenses 311 to 314 conceived as a rearmost movable lens unit. This lens unit is so constructed as to be movable in an optical axis direction and is integrally fixed to a movable cylindrical member 315. This movable cylindrical member 315 is a lens frame integrally formed with a sleeve portion 316. The movable cylindrical member 315 is movable in the optical axis directions while being located based on, e.g., metallic pole parts 400. Further, an actuator, though not illustrated herein, works to move the lens unit in the optical axis directions and may embrace a variety of actuators as explained in the conventional art.

The movable lens unit (311 to 314) is constructed within a fixed cylindrical member, and is constructed such that a rear end of the fixed cylindrical member is provided with a lens-side mount member 308 constituting the bayonet mount, and the lens is interchangeable with respect to the mount member 306 on the side of the camera main body. The movable lens unit is also constructed so as to be properly set at a set position when attached.

Designated by 318 is a lens-side contact point brought into contact with the camera main body side contact point 307 for the communications therebetween when attaching the lens side to the camera side.

A feature of this embodiment is that a glass holder 309 for holding a plate glass or plate plastic 310 in the form of a transparent plate is integrally fixed from behind to the lens-side mount member 308 by use of a pawl member 317. In accordance with this arrangement, even when the lens barrel is removed from the camera main body, as illustrated in FIG. 8, the rear end portion of the lens barrel takes such a form as to be covered with the plate glass 310, and hence the operator, though the fixed plate glass 310 is touched, does not touch the movable lens unit with the result that the lens unit is neither moved nor tilted, and any dust and water drops do not permeate an interior of the lens barrel.

Figure 9:
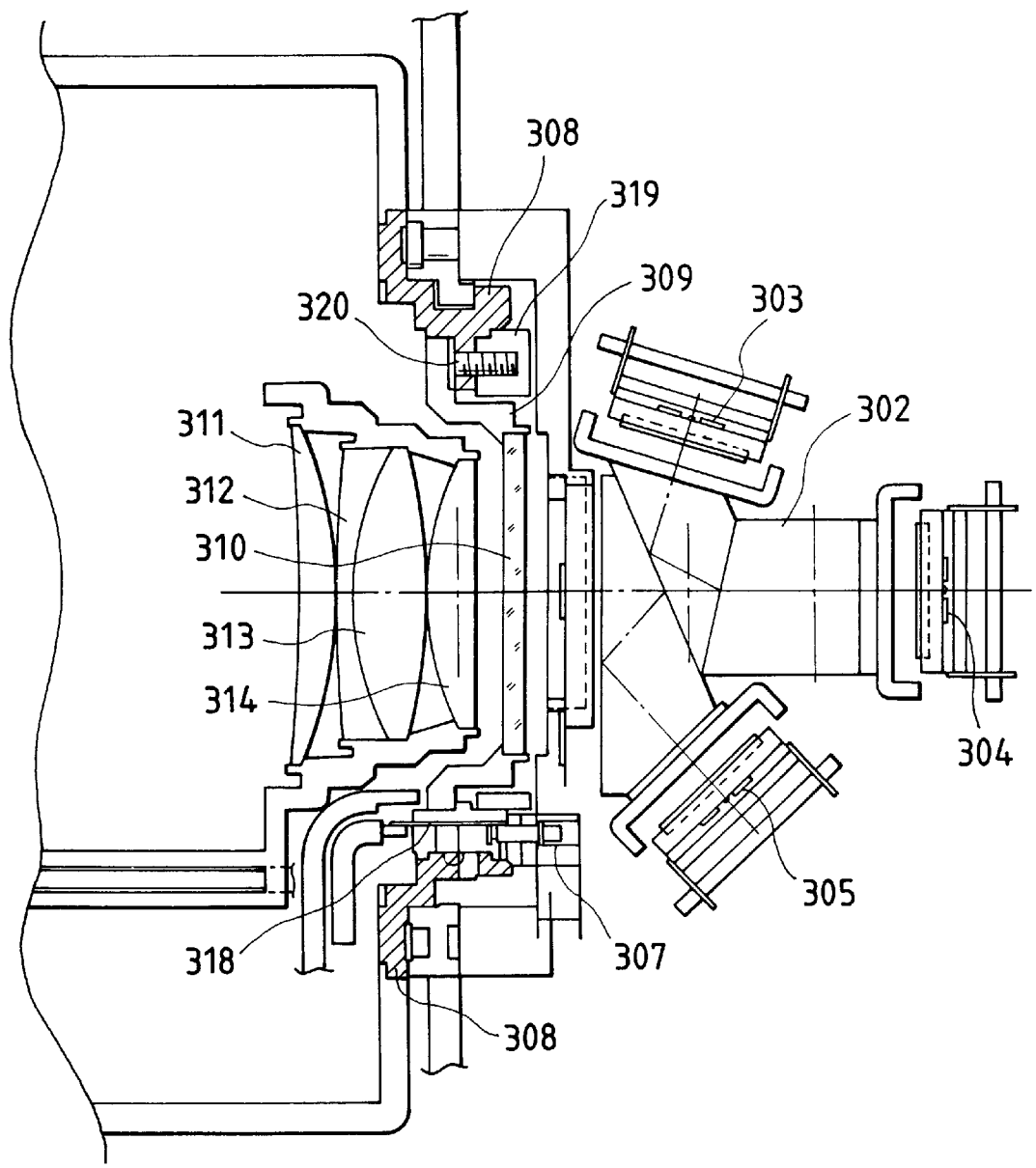
FIG. 9 is a vertical sectional view showing how the lens barrel in an embodiment 2 of the present invention is attached to the camera.

FIG. 9 illustrates an embodiment 2 of the present invention, the arrangement being not that the glass holder 309 is caught by the pawl member 317 as in the structure of the embodiment 1 shown in FIG. 7 but that the glass holder 309 is fastened and fixed to a fixing ring 319 with a screw 320 through the mount member 308.

Incidentally, the construction of the embodiment 1 is that a protrusion 308a is formed at the rear end of the mount member 308, and a position thereof is shifted so that the protrusion 308a is protruded rearward from a rear end surface 331 of the glass holder, thereby avoiding a force from being applied against the glass holder as much as possible when the lens barrel removed from the camera main body is left standing with the mount member underneath. In accordance with an embodiment 2, however, the glass holder is fixed with the screw, and hence it must be expected to be able to provide more strength than the pawl-catching method shown in FIG. 7. Therefore, this fixing ring 319 may serve as a receiving surface when the lens barrel is left standing alone. Accordingly, it is required that the fixing ring 319 be increased in terms of its strength by use of, e.g., a metal.

Figure 10:
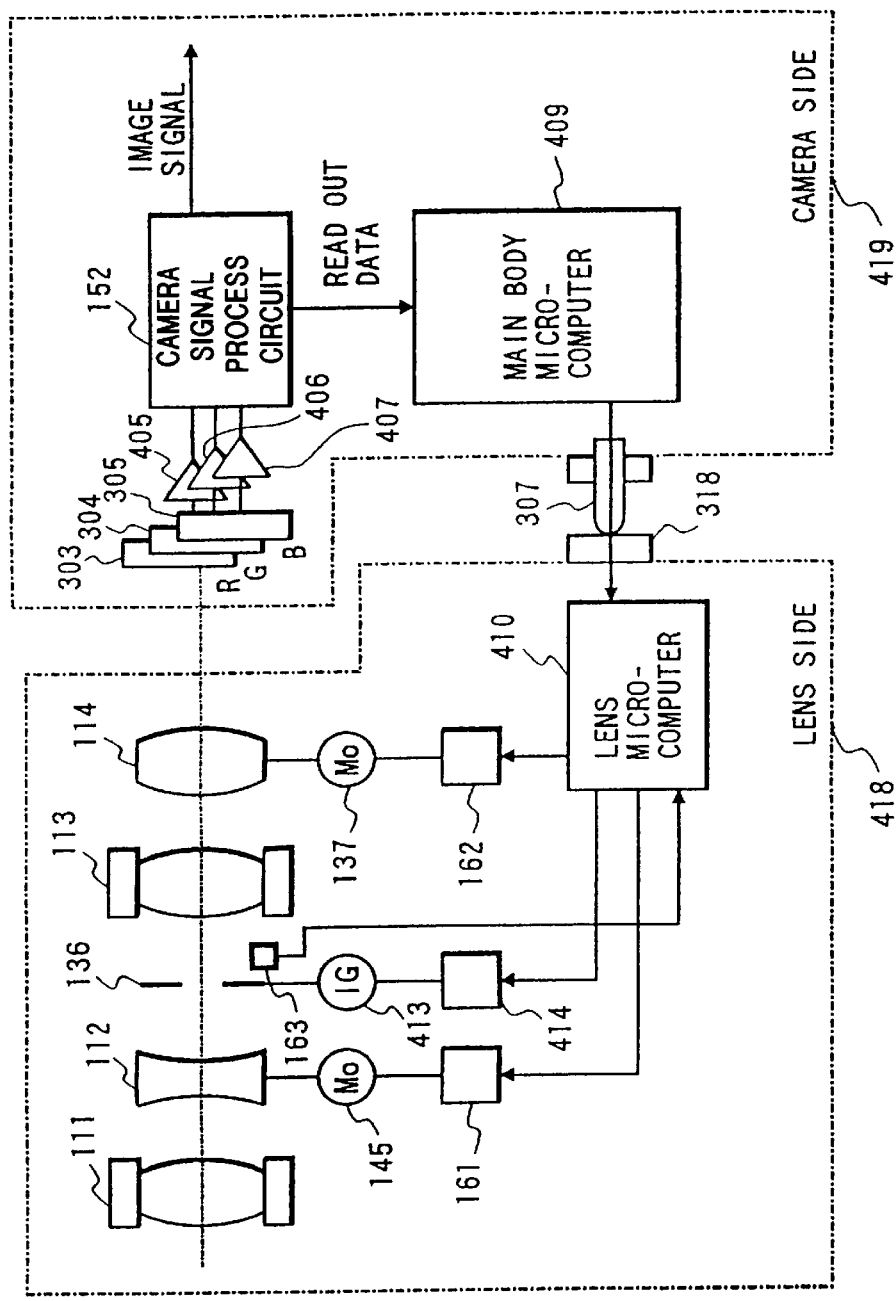
FIG. 10 is a block diagram showing an interchangeable lens system in an embodiment 3 of the present invention.
Figure 11:
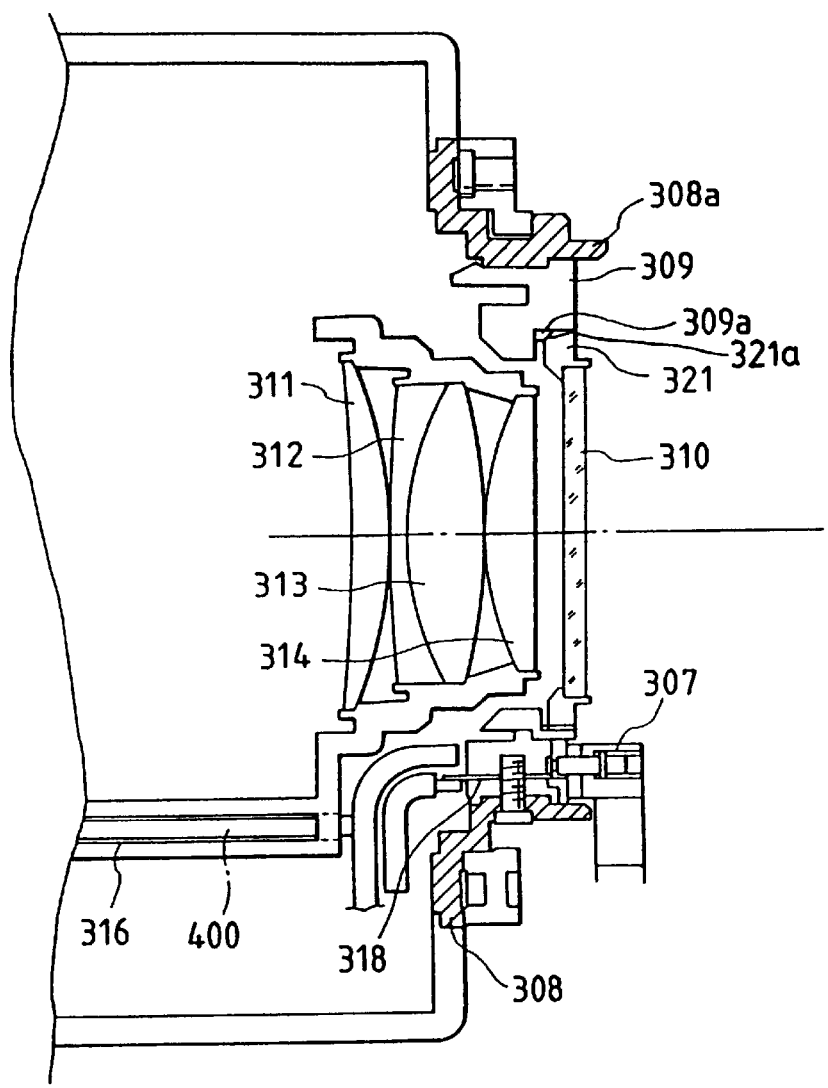
FIG. 11 is a vertical sectional view showing how a plate glass is attached to the lens barrel in an embodiment 4 of the present invention.

FIG. 10 is a block diagram showing one example of an interchangeable lens system in an embodiment 3 of the present invention. Given herein is an explanation of the embodiment in the form of a zoom lens consisting of four, i.e., convex, concave, convex and convex lens units arranged in this sequence from an object side as in the case of the above-mentioned, which zoom lens is common in use for a video camera. Lens configurations other than the above-mentioned may also be adopted. A construction of the lens barrel for housing this zoom lens is shown in FIG. 7 or 9, or FIG. 11 that will be described below.

Light beams from the object travel through a first lens unit 111 (fixed), a varieter lens unit 112 defined as a second lens unit for effecting a zoom, a stop 136, a third lens unit 113 (fixed), and a focus lens unit 114 defined as a fourth lens unit, i.e., a rearmost movable lens unit incorporating a focus adjusting function and a compensating mechanism for compensating a shift on a focus plane with zooming. Then, each of the color components of the three primary colors forms an image on the corresponding image pick-up elements 303, 304 or 305 (such as CCDs).

The respective images on the imaging elements are photoelectrically converted and then amplified each at proper levels by amplifiers 405, 406, 407. Thereafter, the amplified results are inputted to a camera signal processing circuit 152 and are, simultaneously when converted into standard TV signals, read by a main body microcomputer 409 as data about an autofocus adjustment and auto exposure adjustment.

The information read by the main body microcomputer 409 is transferred, together with data (not shown) about respective operation switches such as a zoom switch on the side of the camera main body, to a lens microcomputer 410 via a camera-side contact point 307 and a lens-side contact point 318. Based on information for the autofocus adjustments that are transmitted from the main body microcomputer 409, the lens microcomputer 410 executes a motor control program, whereby a motor 137 is driven by a motor driver 162. The focus lens unit 114 is thereby moved in the optical axis directions, thus adjusting the focus.

Further, if the operation is needed depending on also an information of zoom switch status data transmitted from the main body microcomputer 409, the lens microcomputer 410 transmits signals to a zoom motor driver 161 and a focus motor driver 162 so as to hold the image plane (focusing plane) position during zooming on the basis of positional data of the varieter lens unit 112 and the focus lens unit 114 for holding a focus corresponding to the above-mentioned object distance, which data are stored in the lens microcomputer 410.

The zoom motor driver 161 and the focus motor driver 162 respectively drive the zoom motor 145 and the focus motor 137 on the basis of the signals transmitted from the lens microcomputer 410, thereby moving the varieter lens unit 112 and the focus lens unit 114 in an optical axis direction. The zooming operation is thus carried out without any shift of the focusing position.

Further, the lens microcomputer 410 transmits, to an iris driver 414, signals for giving a proper exposure based on data from an encoder 163 for detecting a stop (aperture) state as well as on data about the exposure adjustment that are transmitted from the main body microcomputer 409. The iris driver 414 drives a stop actuator 413 on the basis of the signals from the lens microcomputer 410, thereby stopping down the stop 136 up to a proper-exposure-providing state.

Thus, the two microcomputers, i.e., the main body microcomputer 409 and the lens microcomputer 410, are respectively provided on the camera side and on the lens side, and the contact points 307, 318 are provided in the communication path for the two microcomputers on respective sides in an attachable/detachable manner. The lens unit 418 is thereby attachable to and detachable from the camera main body 419, and the same autofocus adjustment, auto exposure adjustment and zoom operation as those in an ordinary video camera having the lens integral with the camera can be performed without any trouble.

FIG. 11 is a sectional view illustrating how the plate glass 310 is attached to the lens barrel in an embodiment 4 of the present invention. The glass holder 309 includes a female thread 309a for fitting an accessory. The plate glass is secured to a filter frame 321 with a male thread 321a formed on its outer periphery and meshing with the female screw 309a.

Herein, the plate glass 310 may involve the use of those incorporating a variety of functions such as an ND filter, a color temperature conversion filter, a filter exhibiting an effect in forming a soft image and a low-pass filter. Those filters can be exchanged as the plate glass 310 with the aid of those threads 309a, 321a, and can be used corresponding to cases when needed.

Figure 12:
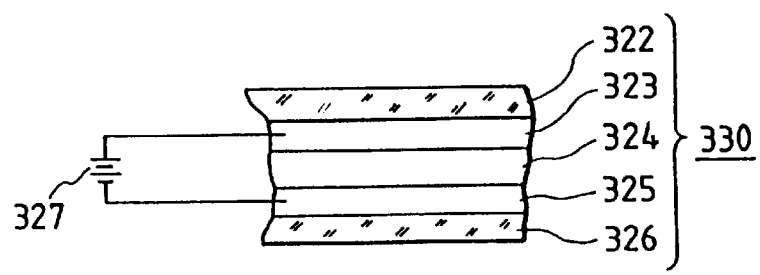
FIG. 12 is a diagram illustrating a structure of a variable ND element in an embodiment 5 of the present invention.

FIG. 12 is partial sectional view showing one example as to a density variable ND filter 330 employed instead of the plate glass 310. Referring to FIG. 12, the numerals 322, 326 designate glass plates, and the numerals 323, 325 represent transparent electrodes. The numeral 324 denotes a color development layer composed of an electro-chromic material. These layers are sequentially laminated. Based on this configuration, a voltage 327 is applied across the transparent electrodes 323, 325, and a magnitude thereof is changed, thereby changing a degree of color development of the color development layer 324.

Note that the method of attaching the ND filter 330 may be based on either the embodiment 1 or the embodiment 2.

A plate plastic may also be employed instead of the plate glass 310 in each of the embodiments.

It is apparent that, in this invention, a wide range of different working modes can be formed based on the invention without deviating from the spirit and scope of the invention. This invention is not restricted by its specific working modes except being limited by the appended claims.

What is claimed is:

1. A lens barrel attachable to and detachable from a main body, comprising:
    a lens system; and
    an ND filter, with a variable density, provided closer to said main body than a rearmost lens unit of said lens system.
2. The lens barrel according to claim 1, wherein said lens unit is movable.
3. The lens barrel according to claim 1, wherein said lens unit is a focusing lens unit movable in an optical axis direction for focusing.
4. The lens barrel according to claim 3, wherein said lens system has a varieter lens unit movable in said optical axis direction for changing a focal length of said lens system.
5. The lens barrel according to claim 4, further comprising:
    a motor for driving said focusing lens unit; and
    a motor for driving said varieter lens unit.
6. The lens barrel according to claim 1, wherein a rearmost part of a mount of said lens barrel is more protruded toward said main body than said transparent plate.
7. The lens barrel according to claim 1, wherein said main body has an imaging element.
8. A lens barrel according to claim 7, wherein said imaging element is a CCD.
9. An optical apparatus comprising:
    a main body; and
    a lens barrel attachable to and detachable from said main body, said lens barrel including a lens system having a rearmost lens unit, and an ND filter, with a variable density, provided closer to said main body than said rearmost lens unit.
10. The optical apparatus according to claim 9, wherein said lens unit is movable.
11. The optical apparatus according to claim 9, wherein said lens unit is a focusing lens unit movable in an optical axis direction for focusing.
12. The optical apparatus according to claim 11, wherein said lens system has a varieter lens unit movable in said optical axis direction for changing a focal length of said lens system.
13. The optical apparatus according to claim 12, further comprising:
    a motor for driving said focusing lens unit; and
    a motor for driving said varieter lens unit.
14. The optical apparatus according to claim 9, wherein a rearmost part of a mount of said lens barrel is more protruded toward said main body than said transparent plate.
15. The optical apparatus according to claim 9, wherein said main body has an imaging element.
16. The optical apparatus according to claim 15, wherein said imaging element is a CCD.
17. A camera comprising:
    a main body; and
    a lens barrel attachable to and detachable from said main body, said lens barrel including a lens system, and an ND filter, with a variable density, provided closer to said main body than a rearmost lens unit of said lens system.
18. The camera according to claim 17, wherein said lens unit is movable.
19. The camera according to claim 17, wherein said lens unit is a focusing lens unit movable in an optical axis direction for focusing.
20. The camera according to claim 19, wherein said lens system has a varieter lens unit movable in said optical axis direction for changing a focal length of said lens system.
21. The camera according to claim 20, further comprising:
    a motor for driving said focusing lens unit; and
    a motor for driving said varieter lens unit.
22. The camera according to claim 17, wherein a rearmost part of a mount of said lens barrel is more protruded toward said main body than said transparent plate.
23. The camera according to claim 17, wherein said main body has an imaging element.
24. The camera according to claim 23, wherein said imaging element is a CCD.
25. A lens barrel attachable to and detachable from a camera body, said lens barrel comprising:
    a fixed tube member;
    a lens system accommodated in said fixed tube member, said lens system including a rearmost lens unit;
    a guide bar that guides movement of said rearmost lens unit;
    a driving motor that generates a driving force for driving said rearmost lens unit to move along said guide bar; and
    a transparent plate disposed at a camera body side of said lens barrel relative to said rearmost lens unit and fixed to said fixed tube member.
26. A lens barrel according to claim 25, wherein said guide bar guides movement of said rearmost lens unit along an optical axis so as to effect a focusing operation.
27. A lens barrel according to claim 25, wherein said guide bar guides movement of said rearmost lens unit along an optical axis so as to effect a zooming operation.
28. A system comprising:
    a camera body; and
    a lens barrel attachable to and detachable from said camera body, said lens barrel including:
    a fixed tube member;
    a lens system accommodated in said fixed tube member, said lens system including a rearmost lens unit;
    a guide bar that guides movement of said rearmost lens unit;
    a driving motor that generates a driving force for driving said rearmost lens unit to move along said guide bar; and
    a transparent plate disposed at a camera body side of said lens barrel relative to said rearmost lens unit and fixed to said fixed tube member.
29. A system according to claim 28, wherein said guide bar guides movement of said rearmost lens unit along an optical axis so as to effect a focusing operation.
30. A system according to claim 28, wherein said guide bar guides movement of said rearmost lens unit along an optical axis so as to effect a zooming operation.

* * * * *

UNITED STATES PATENT AND TRADEMARK OFFICE
CERTIFICATE OF CORRECTION

PATENT NO. : 6,002,885

DATED : December 14, 1999

INVENTOR(S): NAOYA KANEDA

Page 1 of 2

Figure 1:
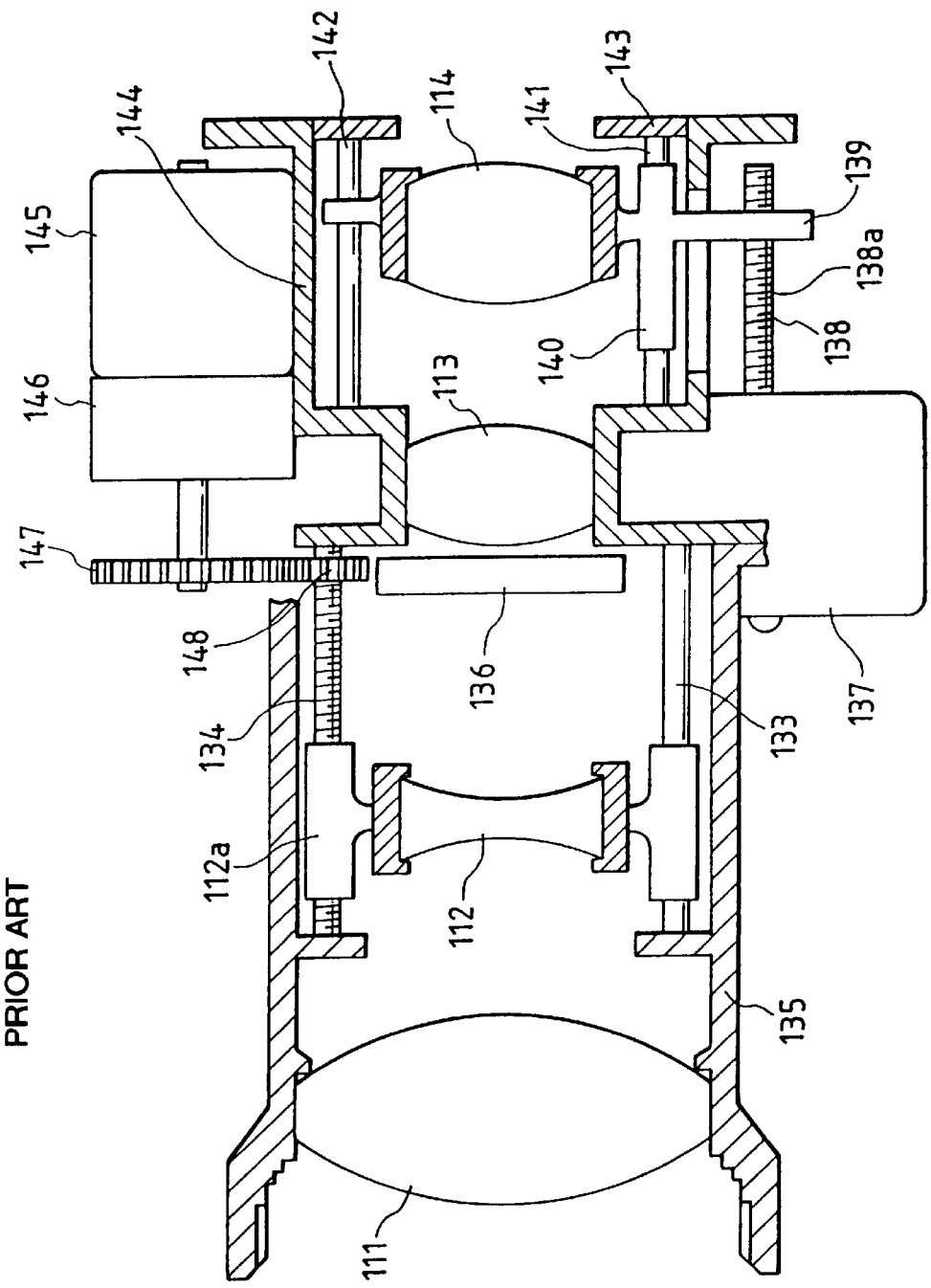
FIG. 1 is a vertical sectional view illustrating a conventional lens barrel.
Figure 2:
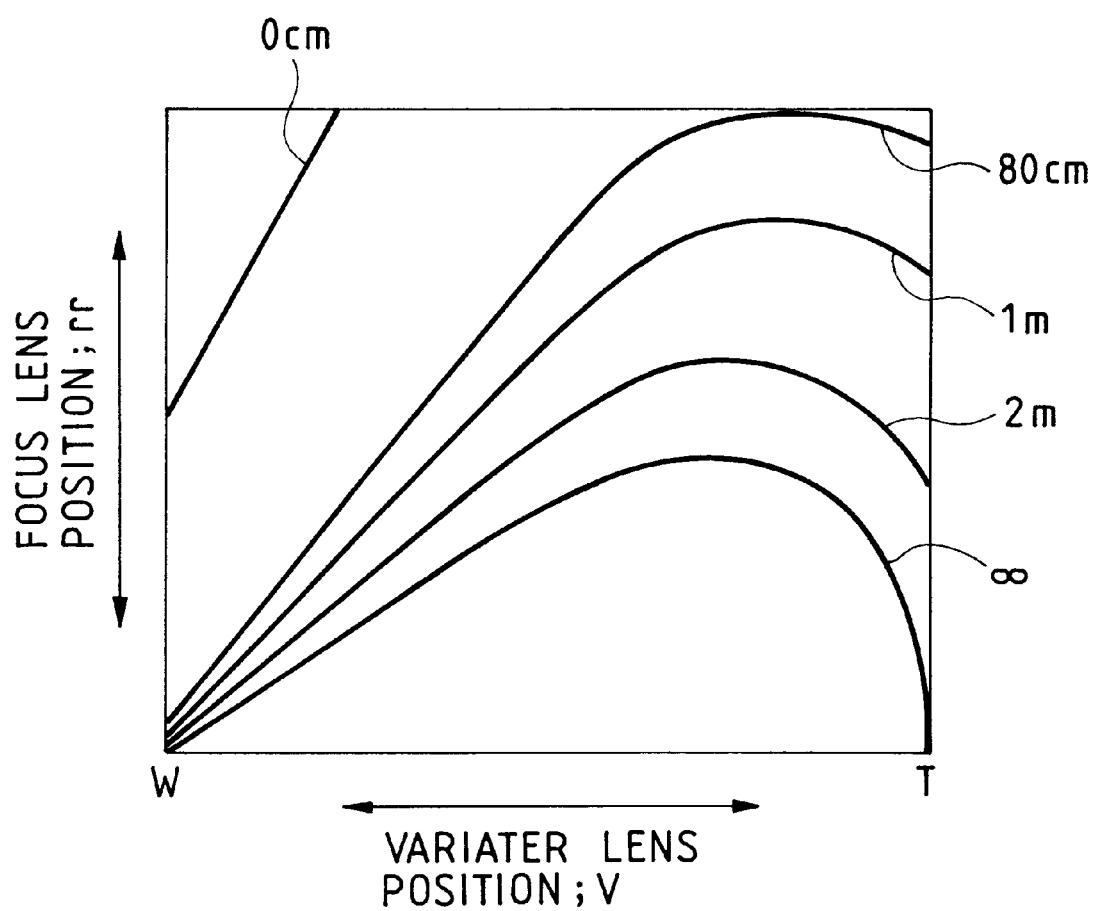
FIG. 2 is a graph showing a positional relationship of a varieter lens unit versus a focus lens unit in the lens barrel shown in FIG. 1, corresponding to object distances.
Figure 3:
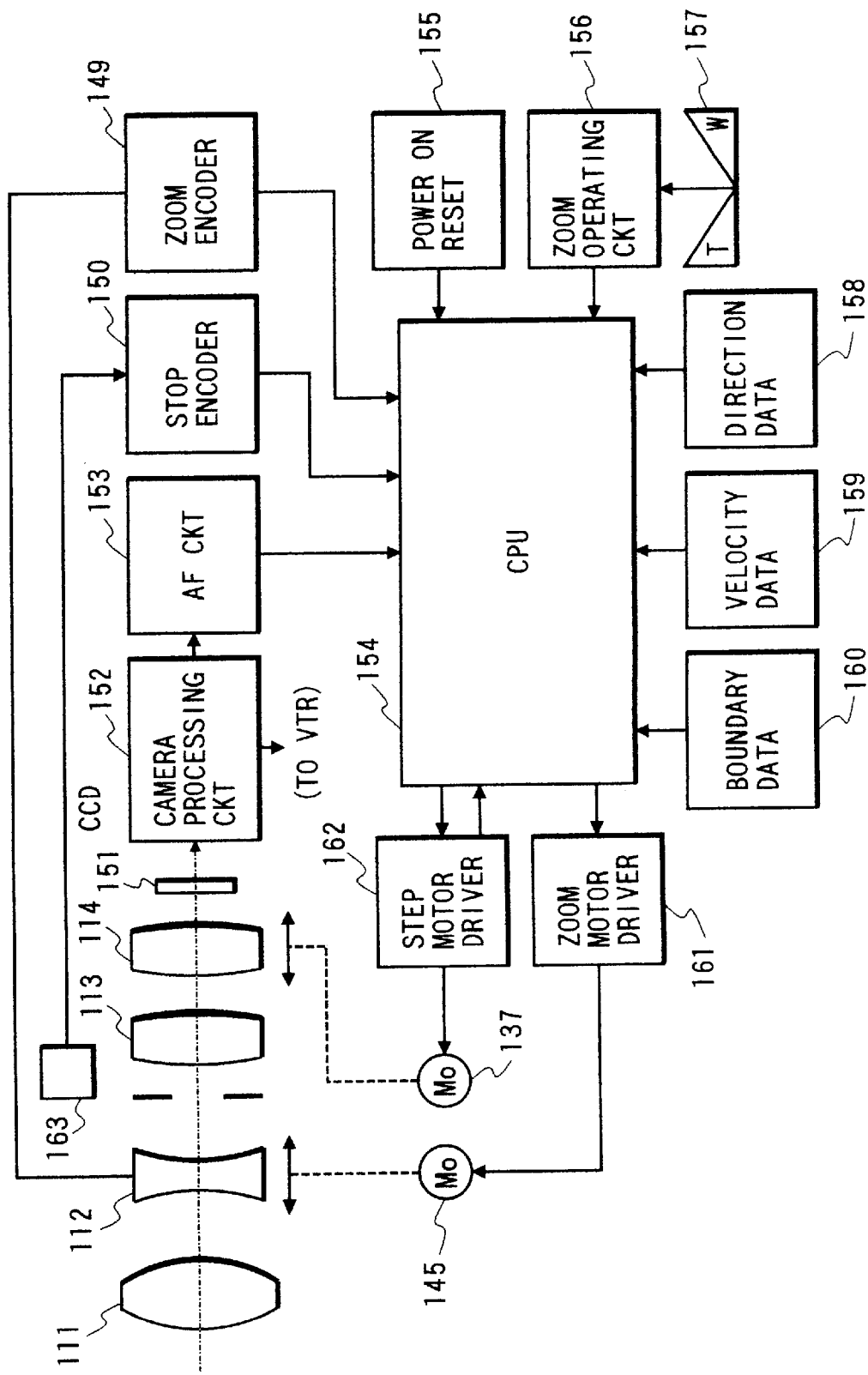
FIG. 3 is a diagram illustrating a construction of a video camera in which a method of tracing a trajectory in the positional relationship in FIG. 2 is carried out.
Figure 4:
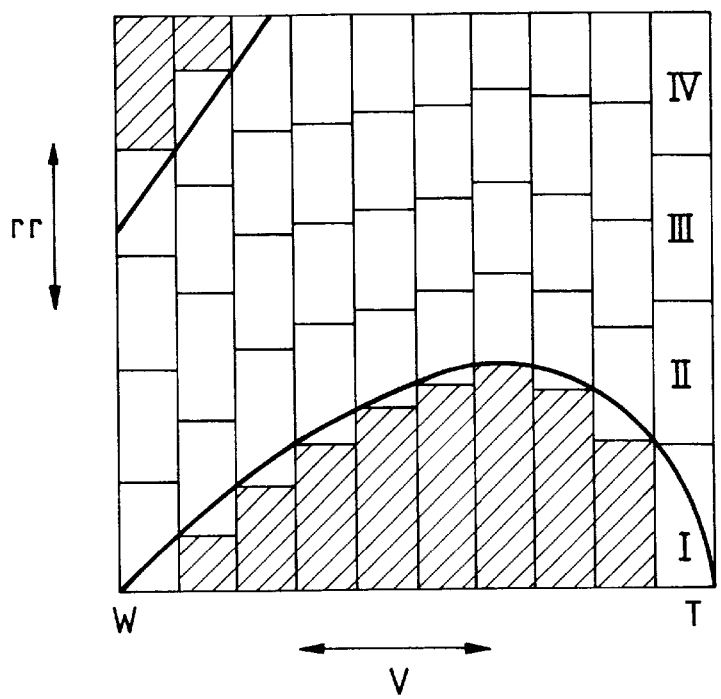
FIG. 4 is a diagram showing segmented small zones in FIG. 2.
Figure 5:
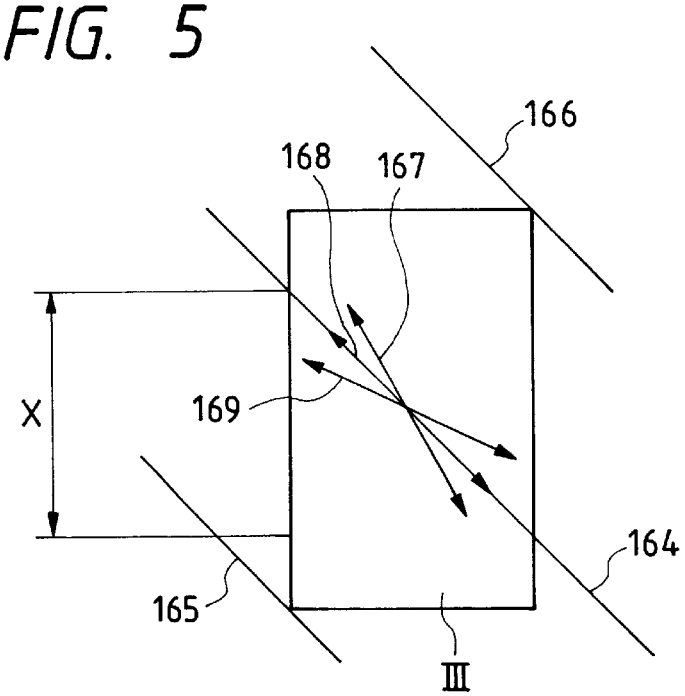
FIG. 5 is an enlarged diagram illustrating one small zone in FIG. 4.
Figure 6:
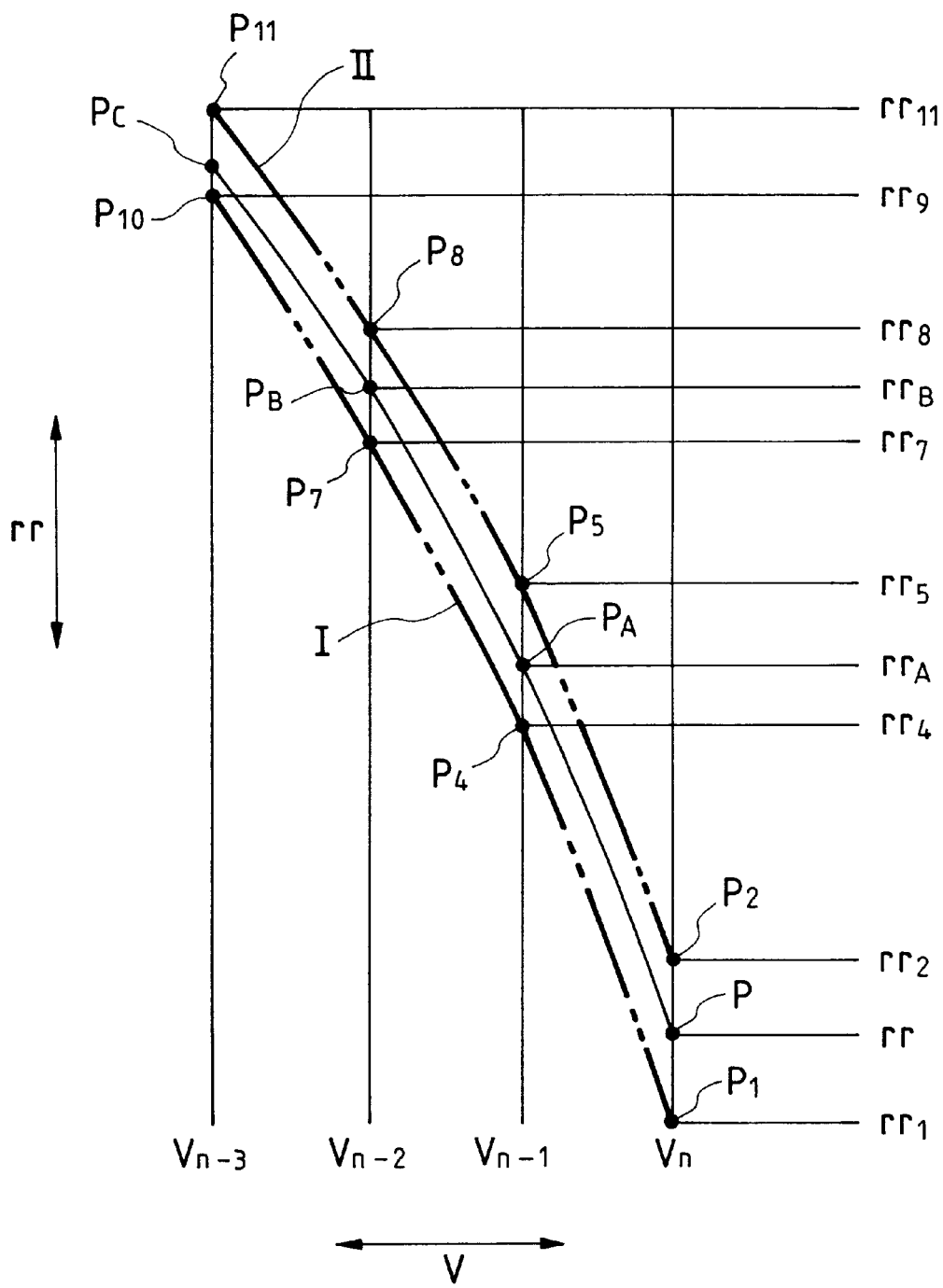
FIG. 6 is a diagram showing trajectories in the vicinity of a telescopic end when zoomed.

It is certified that error appears in the above-identified patent and that said Letters Patent is hereby corrected as shown below:

In the Drawing:
At Fig. 2

"VARIATER" should read --VARIETER--.

Column 3

Line 3, "telescopic" should read --telephoto--.

Column 4

Line 8, "telescopic" should read --telephoto--.
Line 23, "telescopic" should read --telephoto--.

UNITED STATES PATENT AND TRADEMARK OFFICE
CERTIFICATE OF CORRECTION

PATENT NO. : 6,002,885

DATED : December 14, 1999

INVENTOR(S): NAOYA KANEDA

It is certified that error appears in the above-identified patent and that said Letters Patent is hereby corrected as shown below:

Column 5

Line 60, "one" should read --one of--.

Column 6

Line 14, "telescopic" should read --telephoto--.

Signed and Sealed this

Twenty-eighth Day of November, 2000

Attest:

Q. TODD DICKINSON

Attesting Officer

Director of Patents and Trademarks